(12) United States Patent
Sreedhar et al.

(10) Patent No.: US 12,646,950 B2
(45) Date of Patent: Jun. 2, 2026

(54) SYSTEMS AND METHODS FOR BULK CAPACITOR PRE-CHARGE USING SILICON CONTROLLED RECTIFIER FOR BATTERY CHARGER FOR ELECTRIC VEHICLE

(71) Applicant: BorgWarner US Technologies LLC, Wilmington, DE (US)

(72) Inventors: Sunil Sreedhar, Westfield, IN (US); Alexandre M. S. Reis, Westfield, IN (US); Sean Daniel Harrison-Nayes, Faversham (GB)

(73) Assignee: BorgWarner US Technologies LLC, Wilmington, DE (US)

( * ) Notice: Subject to any disclaimer, the term of this patent is extended or adjusted under 35 U.S.C. 154(b) by 316 days.

(21) Appl. No.: 18/300,543

(22) Filed: Apr. 14, 2023

(65) Prior Publication Data

US 2024/0348080 A1 Oct. 17, 2024

(51) Int. Cl.
| | |
|---|---|
| *H02J 7/02* | (2016.01) |
| *B60L 53/30* | (2019.01) |
| *B60L 53/60* | (2019.01) |
| *H02J 7/34* | (2006.01) |
| *H02M 1/08* | (2006.01) |
| *H02M 1/42* | (2007.01) |

(52) U.S. Cl.
CPC ................ *H02J 7/02* (2013.01); *B60L 53/30* (2019.02); *B60L 53/60* (2019.02); *H02J 7/345* (2013.01); *H02M 1/08* (2013.01); *H02M 1/4208* (2013.01); *B60L 2210/30* (2013.01)

(58) Field of Classification Search
CPC .. H02J 7/02; H02J 7/345; H02M 1/08; H02M 1/4208; B60L 53/60; B60L 53/30; B60L 2210/30

USPC .......................................................... 363/125
See application file for complete search history.

(56) References Cited

U.S. PATENT DOCUMENTS

| | | | |
|---|---|---|---|
| 4,618,810 A | 10/1986 | Hagerman et al. | |
| 6,055,167 A * | 4/2000 | Shamkovich | ....... H02M 1/4225 363/54 |
| 11,485,244 B2 * | 11/2022 | Ruano Álvarez | ....... B60L 50/60 |
| 2003/0076075 A1 | 4/2003 | Ma et al. | |
| 2015/0131343 A1 * | 5/2015 | Hufnagel | ............ H02M 1/4225 363/49 |

(Continued)

FOREIGN PATENT DOCUMENTS

| | | |
|---|---|---|
| EP | 2498388 A2 | 9/2012 |
| EP | 2501026 A2 | 9/2012 |

(Continued)

OTHER PUBLICATIONS

STMicroelectronics: "Totem-pole PFC reference design with Sic technology", Jul. 3, 2020, XP055923299, URL: https://www.st.com/content/dam/pcim-2020/presentations/stmicroelectronics-pcim2020-totem-pole-pfc-reference-design-with-sic-technology.pdf.

*Primary Examiner* — Thienvu V Tran
*Assistant Examiner* — Lauren Ashley Shaw
(74) *Attorney, Agent, or Firm* — Joshua M. Haines; Bookoff McAndrews, PLLC

(57) ABSTRACT

A system includes: a battery charger to convert AC power to DC power to charge a battery, wherein the battery charger includes: an upper switch to condition an input voltage and input current; a lower switch to condition the input voltage and the input current: an upper silicon controlled rectifier (SCR); a lower SCR; and a bulk capacitor.

11 Claims, 7 Drawing Sheets

(56)         References Cited

U.S. PATENT DOCUMENTS

2020/0389086  A1     12/2020  Bene et al.
2021/0336533  A1 *   10/2021  Benabdelaziz  ......... H02M 7/12

FOREIGN PATENT DOCUMENTS

EP          2871760  A1     5/2015
EP          3748831  A1 *  12/2020   ............. H02M 1/32

* cited by examiner

SYSTEMS AND METHODS FOR BULK CAPACITOR PRE-CHARGE USING SILICON CONTROLLED RECTIFIER FOR BATTERY CHARGER FOR ELECTRIC VEHICLE

TECHNICAL FIELD

Various embodiments of the present disclosure relate generally to systems and methods for pre-charging a bulk capacitor for a battery charger, and, more particularly, to systems and methods using a silicon controlled rectifier (SCR) to pre-charge a bulk capacitor for a battery charger for an electric vehicle.

BACKGROUND

A battery charger may include a bulk capacitor to smooth and/or supplement an output power. The bulk capacitor may be pre-charged in a start-up operation to support a full power capability of the battery charger. The pre-charging operation may require additional components, which may require additional space and cost, which may not be flexible for varying situations, and which may introduce additional points of failure.

The present disclosure is directed to overcoming one or more of these above-referenced challenges.

SUMMARY OF THE DISCLOSURE

In some aspects, the techniques described herein relate to a system including: a battery charger to convert AC power to DC power to charge a battery, wherein the battery charger includes: an upper switch to condition an input voltage and input current; a lower switch to condition the input voltage and the input current: an upper silicon controlled rectifier (SCR); a lower SCR; and a bulk capacitor.

In some aspects, the techniques described herein relate to a system, further including: one or more controllers configured to control the upper SCR and the lower SCR to pre-charge the bulk capacitor.

In some aspects, the techniques described herein relate to a system, wherein the one or more controllers are further configured to control the upper switch and the lower switch.

In some aspects, the techniques described herein relate to a system, wherein the one or more controllers are further configured to determine a firing angle to control the upper SCR and the lower SCR to pre-charge the bulk capacitor.

In some aspects, the techniques described herein relate to a system, wherein the one or more controllers are further configured to determine the firing angle so that the firing angle is reduced as a voltage of the bulk capacitor increases.

In some aspects, the techniques described herein relate to a system, wherein the one or more controllers are further configured to determine the firing angle in each AC half cycle before the upper SCR or the lower SCR is turned on.

In some aspects, the techniques described herein relate to a system, wherein the one or more controllers are further configured to determine the firing angle based on a threshold AC current.

In some aspects, the techniques described herein relate to a system, wherein the one or more controllers are further configured to increase the threshold AC current at lower AC voltages.

In some aspects, the techniques described herein relate to a system, wherein the upper switch, lower switch, upper SCR and lower SCR are a power factor correction (PFC) converter.

In some aspects, the techniques described herein relate to a system, further including: the battery configured to receive the DC power from the battery charger.

In some aspects, the techniques described herein relate to a vehicle including the system.

In some aspects, the techniques described herein relate to a system to pre-charge a bulk capacitor, the system including: an upper silicon controlled rectifier (SCR) to switch an input power to a bulk capacitor; and a lower SCR to switch the input power to the bulk capacitor.

In some aspects, the techniques described herein relate to a system, wherein the upper SCR and lower SCR are in a power factor correction (PFC) converter.

In some aspects, the techniques described herein relate to a system, further including: one or more controllers configured to control the upper SCR and the lower SCR to pre-charge the bulk capacitor.

In some aspects, the techniques described herein relate to a system, wherein the one or more controllers are further configured to determine a firing angle to control the upper SCR and the lower SCR to pre-charge the bulk capacitor.

In some aspects, the techniques described herein relate to a system, wherein the one or more controllers are further configured to determine the firing angle in each AC half cycle before the upper SCR or the lower SCR is turned on.

In some aspects, the techniques described herein relate to a system, wherein the one or more controllers are further configured to determine the firing angle using one or more of a threshold AC current, a voltage of the bulk capacitor, an inductance of the PFC converter, a capacitance of the bulk capacitor, a voltage of the input power, or a frequency of the input power.

In some aspects, the techniques described herein relate to a method including: receiving, by one or more controllers, one or more input variables including one or more of a threshold AC current, a voltage of a bulk capacitor, an inductance of a PFC converter, a capacitance of the bulk capacitor, a voltage of an input power, or a frequency of the input power; and controlling one or more silicon controlled rectifiers to pre-charge the bulk capacitor based on the one or more input variables.

In some aspects, the techniques described herein relate to a method, wherein the controlling the one or more silicon controlled rectifiers further includes: determining a firing angle based on the one or more input variables, and controlling the one or more silicon controlled rectifiers to pre-charge the bulk capacitor based on the determined firing angle.

In some aspects, the techniques described herein relate to a method, wherein the determining the firing angle based on the one or more input variables is performed in each AC half cycle before the one or more silicon controlled rectifiers are turned on.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
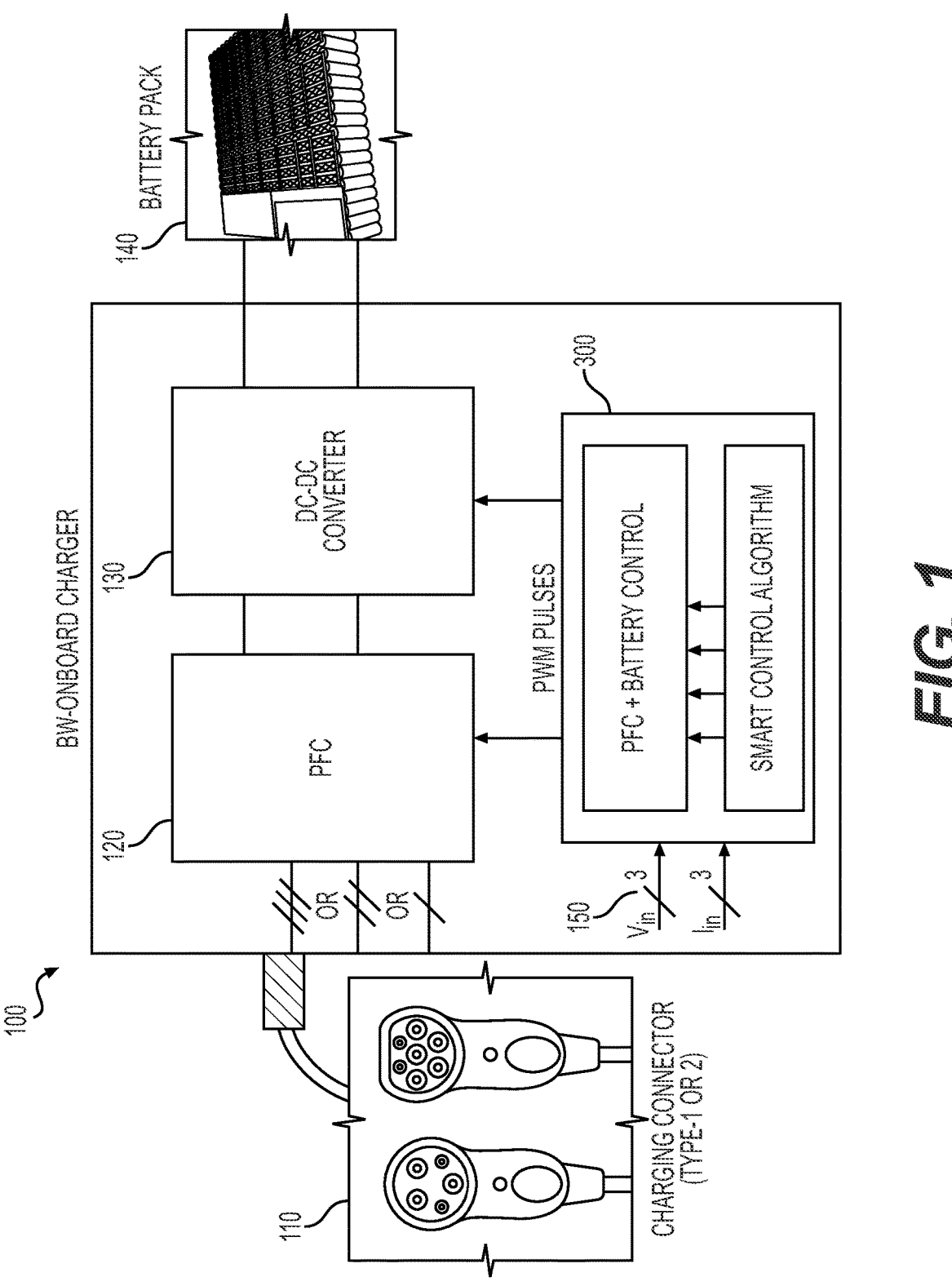
FIG. 1 depicts an exemplary system infrastructure for a battery charger, according to one or more embodiments.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value.

Various embodiments of the present disclosure relate generally to systems and methods for pre-charging a bulk capacitor for a battery charger, and, more particularly, to systems and methods using a silicon controlled rectifier to pre-charge a bulk capacitor for a battery charger for an electric vehicle.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

A battery charger may include a bulk capacitor to smooth and/or supplement an output power. The bulk capacitor may be pre-charged in a start-up operation to support a full power capability of the battery charger. The pre-charging operation may require additional components, which may require additional space and cost, which may not be flexible for varying situations, and which may introduce additional points of failure.

A totem pole design of a power factor correction (PFC) converter and/or DC-DC converter according to some designs may have different options for a neutral leg, such as diodes (for a uni-directional charger and lower efficiency option), or FETs (for a bi-directional charger and higher efficiency option). A PFC according to some designs may use a positive temperature coefficient thermistor with a relay, or a fixed resistor with a relay, for example.

In some designs, a pre-charge operation may start upon application of AC voltage or closure of a pre-charge relay. A main relay may be closed only after pre-charge of the bulk capacitor, when the bulk capacitor is at, or within a few volts of, AC peak voltage, to reduce inrush current through the main relay and/or components in the path to the bulk capacitor. The amplitude of the AC current pulses may increase with a voltage difference between an applied AC voltage and bulk capacitor voltage. A pre-charge time may be longer because a pre-charge resistor may be selected for a worst case scenario to reduce power dissipation. A pre-charge circuit may include additional components, such as power components, a resistor, relays, and auxiliary circuits such as a relay driver and diagnostic circuitry. These additional components, and particularly a pre-charge relay, may introduce a point of failure. Also, the passive component design may limit flexibility to handle different types of AC voltages and adjust the AC current levels, and may increase the control complexity and make the design bulky. The passive component design may limit a reduction of a pre-charge time due to fixed passive components and may not provide any control over AC current pulses. For example, a typical pre-charge time of a passive component design may be 3 seconds for 230 VAC.

In some designs, an AC pre-charge is performed using relays in parallel with a resistor/PTC. The AC current is limited using a resistor during the pre-charge process and then the relay is closed. The relay design is a bulky design and non-flexible based on the use of passive components. The component's mechanical and electrical design forces the pre-charge time to be limited and does not provide any control of AC current.

In some designs, AC current is not controlled, and increases as AC voltage increases. A pre-charge time is longer because the components are selected for worst case scenario to reduce power dissipation. Additionally, an AC relay is a weak link and must be monitored over a life time of the switch.

One or more embodiments may reduce high AC currents by determining a firing angle to ensure AC currents are within limits. One or more embodiments may avoid increasing AC currents as capacitor voltage increases by reducing the firing angle as capacitor voltage increases. One or more embodiments may use two MOSFETs and two SCRs which are part of the PFC boost converter to maintain a semiconductor component count. One or more embodiments may eliminate AC relay life cycle issues and monitoring of switching life time by eliminating the AC relay and resistor/PTC.

One or more embodiments may use a silicon controlled rectifier (SCR) in a neutral leg of a PFC so that no additional hardware is required to perform AC pre-charge of a bulk capacitor, as the silicon controlled rectifiers are also used for PFC operation. One or more embodiments may provide a dynamic and adjustable pre-charge control algorithm to drive an SCR-based bulk capacitor charge circuit. One or more embodiments may use PFC boost converter components and do not require any additional components.

One or more embodiments may turn on an SCR in a second and fourth quadrant of an AC cycle, and automatically turn off the SCR at the respective following zero crossing of the AC cycle. One or more embodiments may determine a firing angle where the SCR can be turned on to charge the bulk capacitor while ensuring the AC current remains within specified limits. One or more embodiments may calculate the next firing angle based on the current bulk capacitor voltage, which may allow non-zero voltage bulk capacitor pre-charge. An AC voltage measurement may be used to monitor a line voltage drop or dip. One or more embodiments may include a continuous running control algorithm in a microprocessor to ensure a calculation is completed in each AC half cycle before the SCR is turned ON. One or more embodiments may change an AC current limit during the pre-charge operation. For example, one or more embodiments may decrease pre-charge time by increasing current limit at lower AC voltages. One or more embodiments may include a combination of a MOSFET and SCR, which may allow easier control and longer runtime than an AC relay.

One or more embodiments may determine a firing angle value using AC current limit, present bulk capacitor voltage, PFC inductance, bulk capacitor value, AC voltage, and AC frequency. One or more embodiments may convert, using a sine of the determined firing angle, for example, the determined firing angle to an AC voltage value at which the SCR should be turned on. One or more embodiments may use a difference between the AC voltage value at which SCR will be turned on and the bulk capacitor present voltage for a validity check. One or more embodiments may evaluate the bulk capacitor voltage change validity by confirming the new firing angle would result in a rise of the bulk capacitor voltage.

One or more embodiments may perform a calculation as capacitor voltage increases, and may use the required AC current limits to determine the firing angle. The firing angle calculation may run during the AC voltage quarter cycle in each half cycle and an SCR may be turned on during the next quarter cycle. The firing angle may be calculated to ensure the AC current pulses are within limits.

One or more embodiments may perform a continuous calculation of firing angle, which offers flexibility in the AC pre-charge process as compared to passive components pre-charge, where pre-charge time and AC current are dependent on input AC voltage and temperature, and cannot be controlled per requirements. One or more embodiments may determine a firing angle based on the required AC current limit and current capacitor voltage, which ensures control of AC current as needed for the pre-charge time. One or more embodiments may use a continuous control algorithm running on a microprocessor to consider multiple limits and requirements, and determine the SCR turn on time every half AC cycle, which provides robust control.

Some designs may reduce the AC current pulses as the bulk capacitor is charged. One or more embodiments may maintain the AC current pulse magnitude as the bulk capacitor is charged. One or more embodiments may calculate the next firing angle to maximize the AC current pulse magnitude when the bulk capacitor is charged to a threshold voltage. One or more embodiments may limit AC current pulses to a requirement while ensuring pre-charge is completed at a fast rate. One or more embodiments may use MOSFETs and SCRs, which provide easier control and longer run time than AC relays.

A battery charger according to the disclosure may operate with multiple types of AC input power supplies, including single phase, split/dual/two phase, and three-phase power supplies. The input and output layout of the charger may follow automotive standards. A battery charger according to the disclosure may include a two-stage configuration, including an AC-DC power factor correction converter stage and an isolated DC-DC converter stage.

A battery charger according to the disclosure may operate as a battery charger only, or operate bidirectionally for a charging operation or a power supply operation. The converter may either receive power from an AC power source and provide DC power to a battery, or receive power from the battery and provide power as an AC power source. A vehicle to grid (V2G) operation may be achieved with a designed control strategy for single-phase, two-phase, and three-phase systems. The switches may be any devices, such as GTO, thyristors, or MOSFETs/IGBTs with series diodes, for example. These switches may also be mechanical components (such as relays or contactors) if sufficient failure rates and arcing conditions during operation are met.

FIG. 1 depicts an exemplary system infrastructure for a battery charger, according to one or more embodiments. As shown in FIG. 1, a battery charger 100 may include or be electrically connectable to a charging connector 110. The charging connector 110 may provide an electrical connection from an external power supply to the battery charger 100, and may be a Type 1 or a Type 2 connector, for example. The charging connector 110 may transfer single phase, two-phase, or three phase power.

The battery charger 100 may include a Power Factor Correction (PFC) converter 120, a DC-DC converter 130, and a controller 300 receiving signals from input sensor 150. The battery charger 100 may include or be electrically connectable to a battery 140. The battery charger 100 may be used in automotive vehicles as an onboard charger to transfer power from an external power source through charging connector 110 to battery 140, or to transfer power from battery 140 in a vehicle to grid operation.

All switches described in the disclosure may be any devices, such as GTO, thyristors, or MOSFETs or IGBTs with series diodes, for example. These switches may also be mechanical components (such as relays or contactors) if sufficient failure rates and arcing conditions during operation are met.

Figure 2:
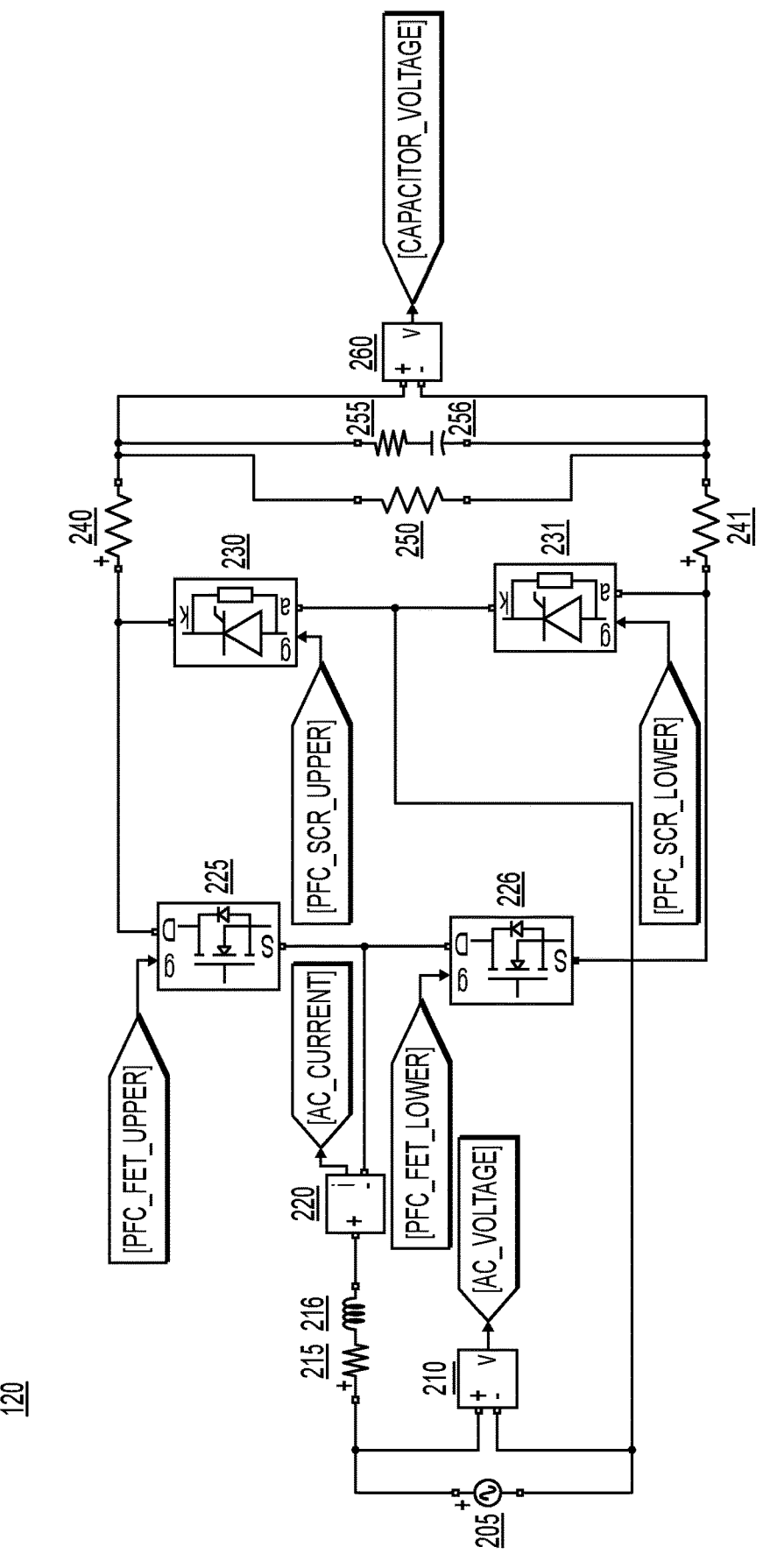
FIG. 2 depicts an exemplary electrical schematic for a battery charger with a silicon controlled rectifier to pre-charge a bulk capacitor, according to one or more embodiments.

FIG. 2 depicts an exemplary electrical schematic for a battery charger with a silicon controlled rectifier to pre-charge a bulk capacitor, according to one or more embodiments. As shown in FIG. 2, PFC converter 120 may receive power from AC power source 205 (through charging connector 110, for example). PFC converter 120 may include input voltage detector 210, input resistor 215, input inductor 216, current detector 220, upper FET switch 225, lower FET switch 226, upper SCR 230, lower SCR 231, upper resistor 240, lower resistor 241, output resistor 250, bulk resistor 255, bulk capacitor 256, and output voltage detector 260. In FIG. 2, input resistor 215, upper resistor 240, lower resistor 241, and bulk resistor 255 may be equivalent resistances of associated electrical components and/or connections. For example, input resistor 215 may be an equivalent series resistance of input inductor 216.

PFC converter 120 and DC-DC converter 130 may communicate with controller 300. As shown in FIG. 2, input voltage detector 210 and output voltage detector 260 may send signals to controller 300. Upper FET switch 225, lower FET switch 226, upper SCR 230, and lower SCR 231 may receive signals from controller 300. The signals from controller 300 may be respective gate control signals, for example, to turn the devices on and off.

Battery charger 100 may reduce high AC currents by determining a firing angle to ensure AC currents are within limits. A firing angle may be an AC voltage angle that from 0 degrees to 360 degrees, and may be an AC voltage angle at which an SCR is turned on. Battery charger 100 may avoid increasing AC currents as bulk capacitor 256 voltage increases by reducing the increase in firing angle as bulk capacitor 256 voltage increases. Battery charger 100 may use upper FET switch 225, lower FET switch 226, upper SCR 230, and lower SCR 231, which are part of the PFC boost converter to maintain a semiconductor component count. Battery charger 100 may eliminate AC relay life cycle issues and monitoring of switching life time by eliminating the AC relay and resistor/PTC.

In a normal operation of the PFC boost converter, upper FET switch 225 and lower FET switch 226 are switching at a high frequency at a duty cycle determined by the controller 300, and the upper SCR 230 and lower SCR 231 are switching at an AC voltage frequency. In a pre-charge operation of the PFC boost converter, upper FET switch 225 and lower FET switch 226 are switching at an AC voltage frequency, and the upper SCR 230 and lower SCR 231 are switching according to the pre-charge algorithm determined by the controller 300, which uses the determined firing angle.

Battery charger 100 may use upper SCR 230 and lower SCR 231 in a neutral leg of PFC converter 120 so that no additional hardware is required to perform AC pre-charge of bulk capacitor 256, as upper SCR 230 and lower SCR 231 are also used for PFC operation. Battery charger 100 may provide a dynamic and adjustable pre-charge control algorithm to drive upper SCR 230 and lower SCR 231 to charge bulk capacitor 256. Battery charger 100 may use PFC boost converter components, and therefore not require any additional components.

Battery charger 100 may turn on one of upper SCR 230 and lower SCR 231 in a second and fourth quadrant of an AC cycle, and automatically turn off the upper SCR 230 or lower SCR 231 at the respective following zero crossing of the AC cycle. Battery charger 100 (and more specifically, controller 300) may determine a firing angle where one of upper SCR 230 and lower SCR 231 can be turned on to charge the bulk capacitor 256 while ensuring the AC current remains within specified limits. Battery charger 100 may calculate the next firing angle based on the current bulk capacitor 256 voltage, which may allow non-zero voltage pre-charge of bulk capacitor 256. Input voltage detector 210 may be used to monitor a line voltage drop or dip. Battery charger 100 may include a continuous running control algorithm in controller 300 to ensure a calculation is completed in each AC half cycle before one of upper SCR 230 and lower SCR 231 is turned on. Battery charger 100 may change an AC current limit during the pre-charge operation. For example, battery charger 100 may decrease pre-charge time by increasing current limit at lower AC voltages. Battery charger 100 may include a combination of upper FET switch 225, lower FET switch 226, upper SCR 230, and lower SCR 231, which may allow easier control and longer runtime than an AC relay.

Battery charger 100 may determine a firing angle value using AC current limit, present bulk capacitor 256 voltage, PFC inductance, bulk capacitor value, AC voltage, and AC frequency. Battery charger 100 may convert, using a sine of the determined firing angle, for example, the determined firing angle to an AC voltage value at which one of upper SCR 230 and lower SCR 231 should be turned on. Battery charger 100 may use a difference between the AC voltage value at which one of upper SCR 230 and lower SCR 231 will be turned on and the present voltage of bulk capacitor 256 for a validity check. Battery charger 100 may evaluate the bulk capacitor voltage change validity by confirming the new firing angle would result in a rise of the bulk capacitor 256 voltage.

Battery charger 100 may perform a calculation as bulk capacitor 256 voltage increases, and may use the required AC current limits to determine the firing angle. The firing angle calculation may be performed by controller 300 during the AC voltage quarter cycle in each half cycle and one of upper SCR 230 and lower SCR 231 may be turned on during the next quarter cycle. The firing angle may be calculated to ensure the AC current pulses are within limits.

Battery charger 100 may perform a continuous calculation of firing angle, which offers flexibility in the AC pre-charge process as compared to passive components pre-charge, where pre-charge time and AC current are dependent on input AC voltage and temperature, and cannot be controlled per requirements. Battery charger 100 may determine a firing angle based on the required AC current limit and current bulk capacitor 256 voltage, which ensures control of AC current as needed for the pre-charge time. Battery charger 100 may use a continuous control algorithm running on controller 300 to consider multiple limits and requirements, and determine SCR turn on time every half AC cycle, which provides robust control.

Battery charger 100 may maintain the AC current pulse magnitude as the bulk capacitor 256 is charged. Battery charger 100 may calculate the next firing angle to maximize the AC current pulse magnitude when the bulk capacitor 256 is charged to a threshold voltage. Battery charger 100 may limit AC current pulses to a requirement while ensuring pre-charge is completed at a fast rate. Battery charger 100 may use upper FET switch 225, lower FET switch 226, upper SCR 230, and lower SCR 231, which provide easier control and longer run time than AC relays.

Figure 3:
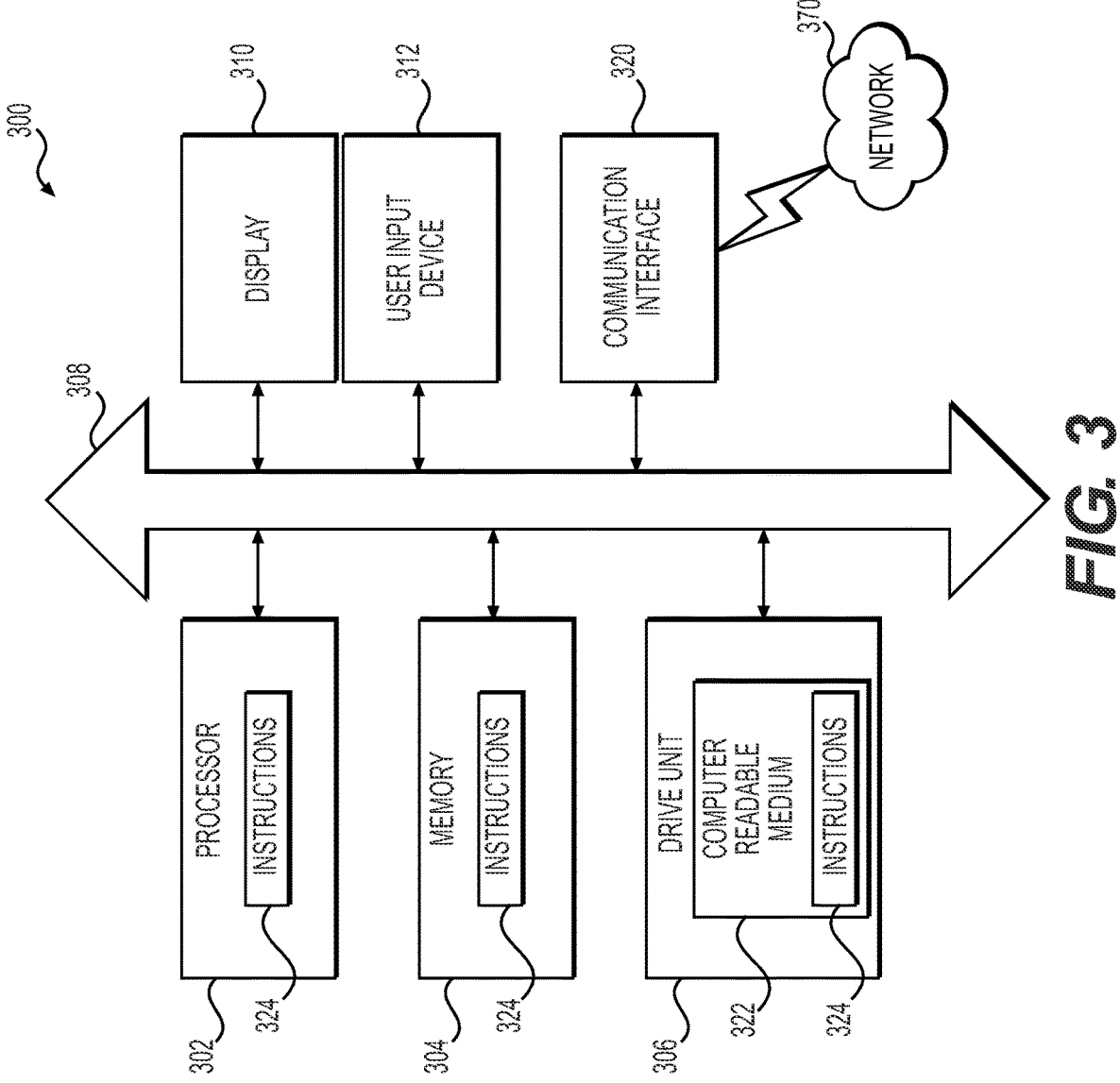
FIG. 3 depicts an implementation of a computer system that may execute techniques presented herein, according to one or more embodiments.

FIG. 3 depicts an implementation of a controller 300 that may execute techniques presented herein, according to one or more embodiments.

Any suitable system infrastructure may be put into place to allow control of the battery charger. FIG. 3 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 3. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

The controller 300 may include a set of instructions that can be executed to cause the controller 300 to perform any one or more of the methods or computer-based functions disclosed herein. The controller 300 may operate as a standalone device or may be connected, e.g., using a network, to other computer systems or peripheral devices.

In a networked deployment, the controller 300 may operate in the capacity of a server or as a client in a server-client user network environment, or as a peer computer system in a peer-to-peer (or distributed) network environment. The controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 300 can be implemented using electronic devices that provide voice, video, or data communication. Further, while the controller 300 is illustrated as a single system, the term "system" shall also be taken to include any collection of systems or sub-systems that individually or jointly execute a set, or multiple sets, of instructions to perform one or more computer functions.

As illustrated in FIG. 3, the controller 300 may include a processor 302, e.g., a central processing unit (CPU), a graphics processing unit (GPU), or both. The processor 302 may be a component in a variety of systems. For example, the processor 302 may be part of a standard computer. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the controller 300 may include an input device 312 configured to allow a user to interact with any of the components of controller 300. The input device 312 may be a number pad, a keyboard, or a cursor control device, such as a mouse, or a joystick, touch screen display, remote control, or any other device operative to interact with the controller 300.

The controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in controller 300, or combinations thereof. The connection with the network 370 may be a physical connection, such as a wired Ethernet connection or may be established wirelessly as discussed below. Likewise, the additional connections with other components of the controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
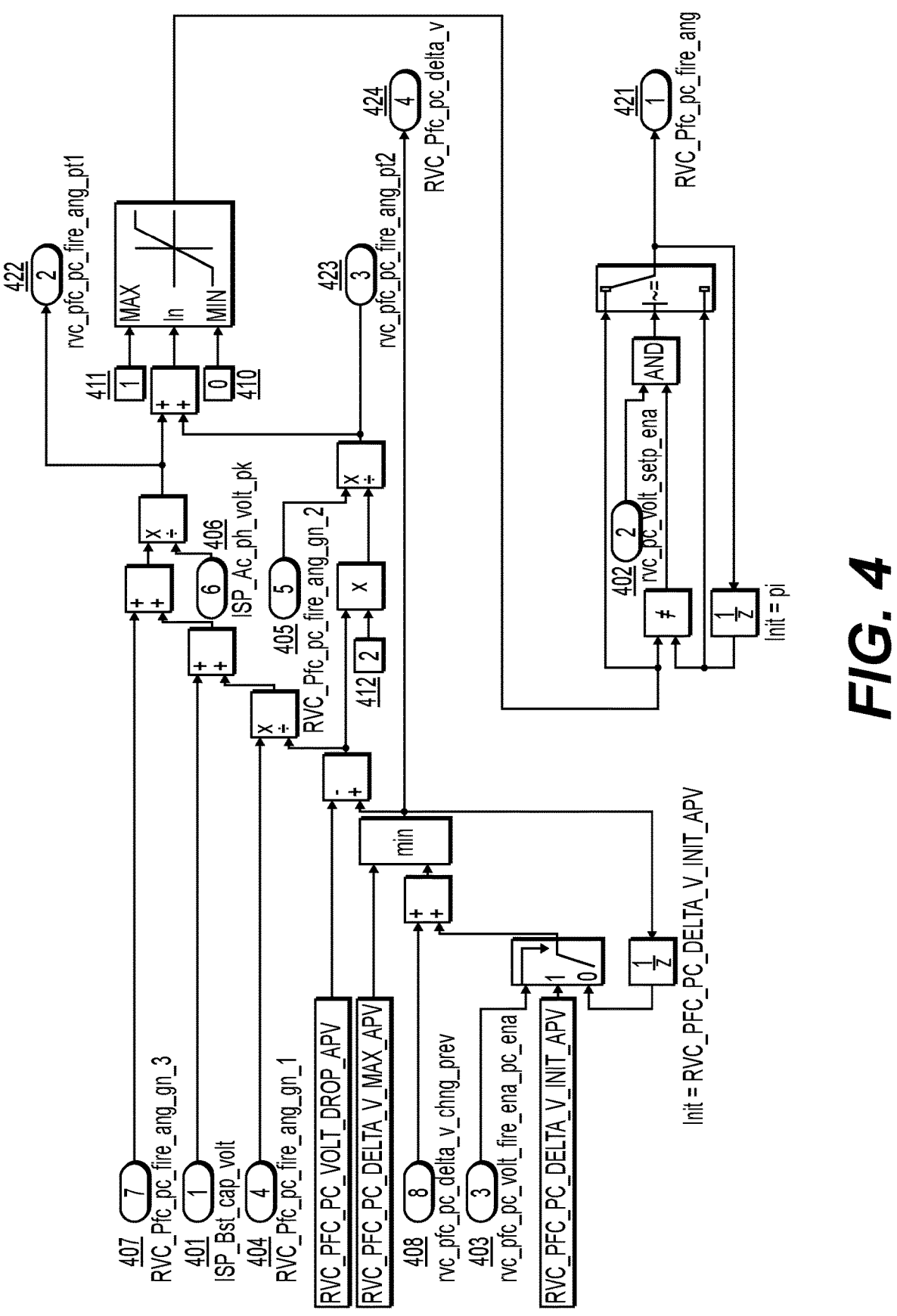
FIG. 4 depicts an exemplary logic diagram for using a silicon controlled rectifier to pre-charge a bulk capacitor, according to one or more embodiments.

FIG. 4 depicts an exemplary logic diagram 400 for using a silicon controlled rectifier to pre-charge a bulk capacitor, according to one or more embodiments. As shown in FIG. 4, controller 300 may receive bulk capacitor voltage 401, setpoint enable 402, SCR enable 403, first fire angle constant 404, second fire angle constant 405, AC voltage peak value 406, third fire angle constant 407, and previous bulk capacitor change value 408. Controller 300 may also receive adjusted values for a voltage drop (RVC_PFC_PC_VOLT_DROP_APV), a maximum delta voltage (RVC_PFC_PC_DELTA_V_MAX_APV), and an initial delta voltage (RVC_PFC_PC_DELTA_V_INIT_APV). Controller 300 may also receive first constant 410, second constant 411, and third constant 412. Controller 300 may determine a firing angle 421, first firing angle pre-calculation 422, second firing angle pre-calculation 423, and bulk capacitor change value 424.

Figure 5:
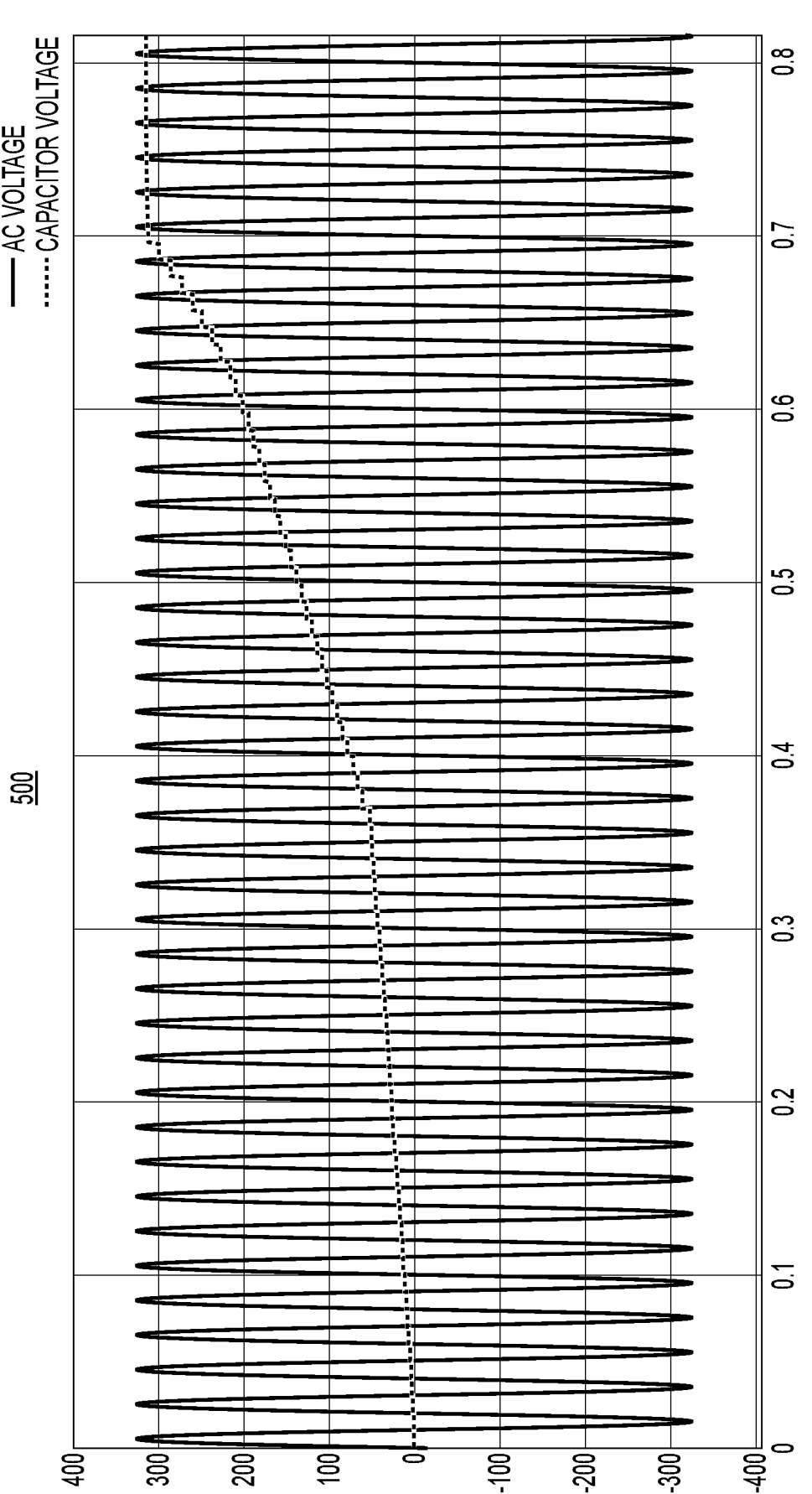
FIG. 5 depicts a plot of a bulk capacitor voltage relative to an AC voltage, according to one or more embodiments.

FIG. 5 depicts a plot 500 of a bulk capacitor voltage relative to an AC voltage, according to one or more embodiments. As shown in FIG. 5, a bulk capacitor voltage may increase from 0 volts to a fully charged state where the bulk capacitor voltage is at, or within a few volts of, AC peak voltage. Battery charger 100 may pre-charge a capacitor from 0 volts, or from any non-zero voltage to a fully charged state.

Figure 6:
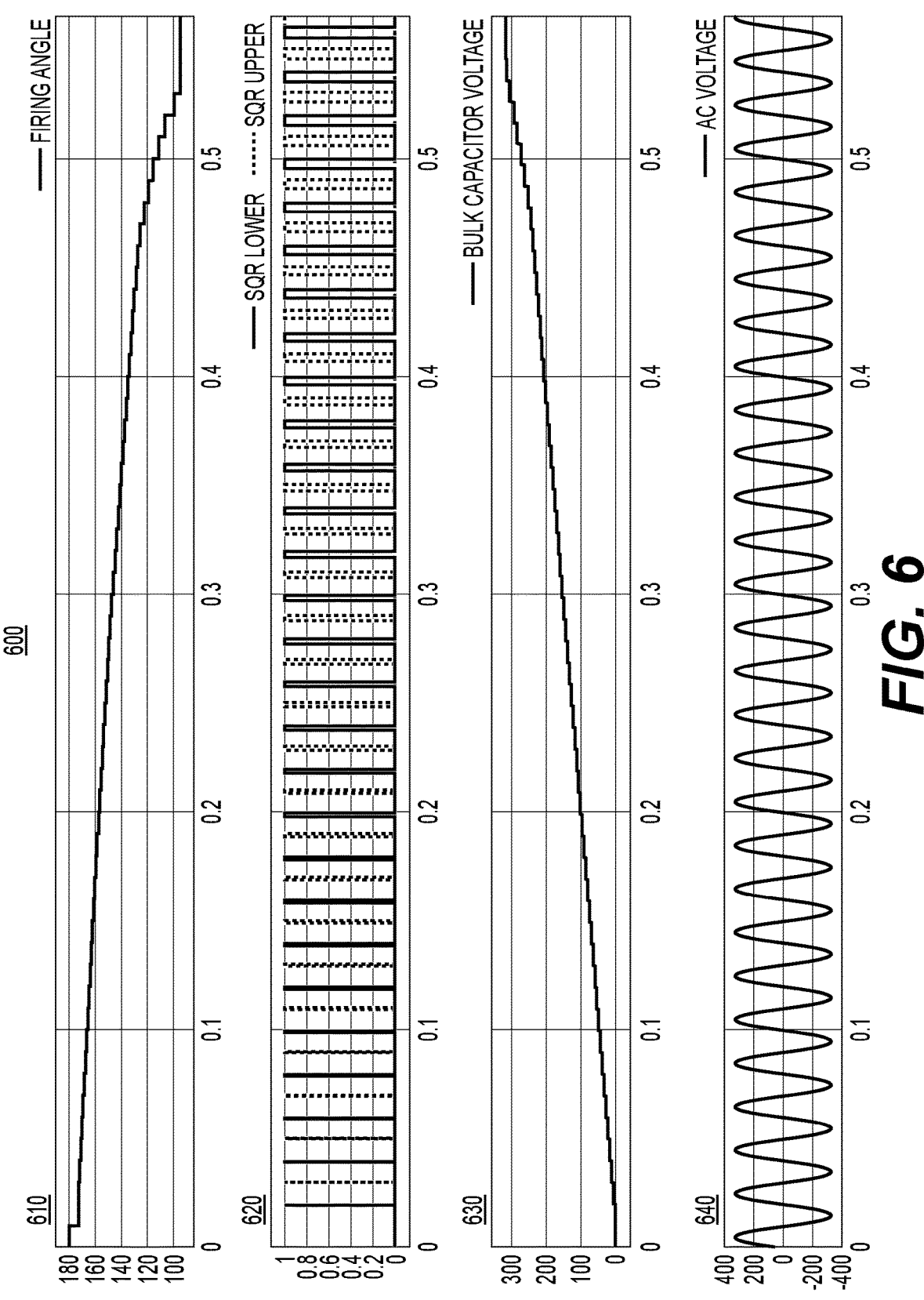
FIG. 6 depicts a plot of signals for a battery charger with a silicon controlled rectifier to pre-charge a bulk capacitor, according to one or more embodiments.

FIG. 6 depicts a plot 600 of signals for a battery charger with a silicon controlled rectifier to pre-charge a bulk capacitor, according to one or more embodiments. As shown in FIG. 6, a firing angle 610 may decrease and a pulse width 620 may increase as a bulk capacitor voltage 630 increases based on an input AC voltage 640. In FIG. 6, firing angle 610 is shown for a rectified AC voltage, so that the angle varies from 180 degrees to 90 degrees. Depending on the half cycle, firing angle 610 may vary from 180 degrees to 90 degrees or from 360 degrees to 270 degrees. As shown in FIG. 6, bulk capacitor voltage 630 may be pre-charged from 0V to a fully charged state in approximately 0.55 seconds.

Figure 7:
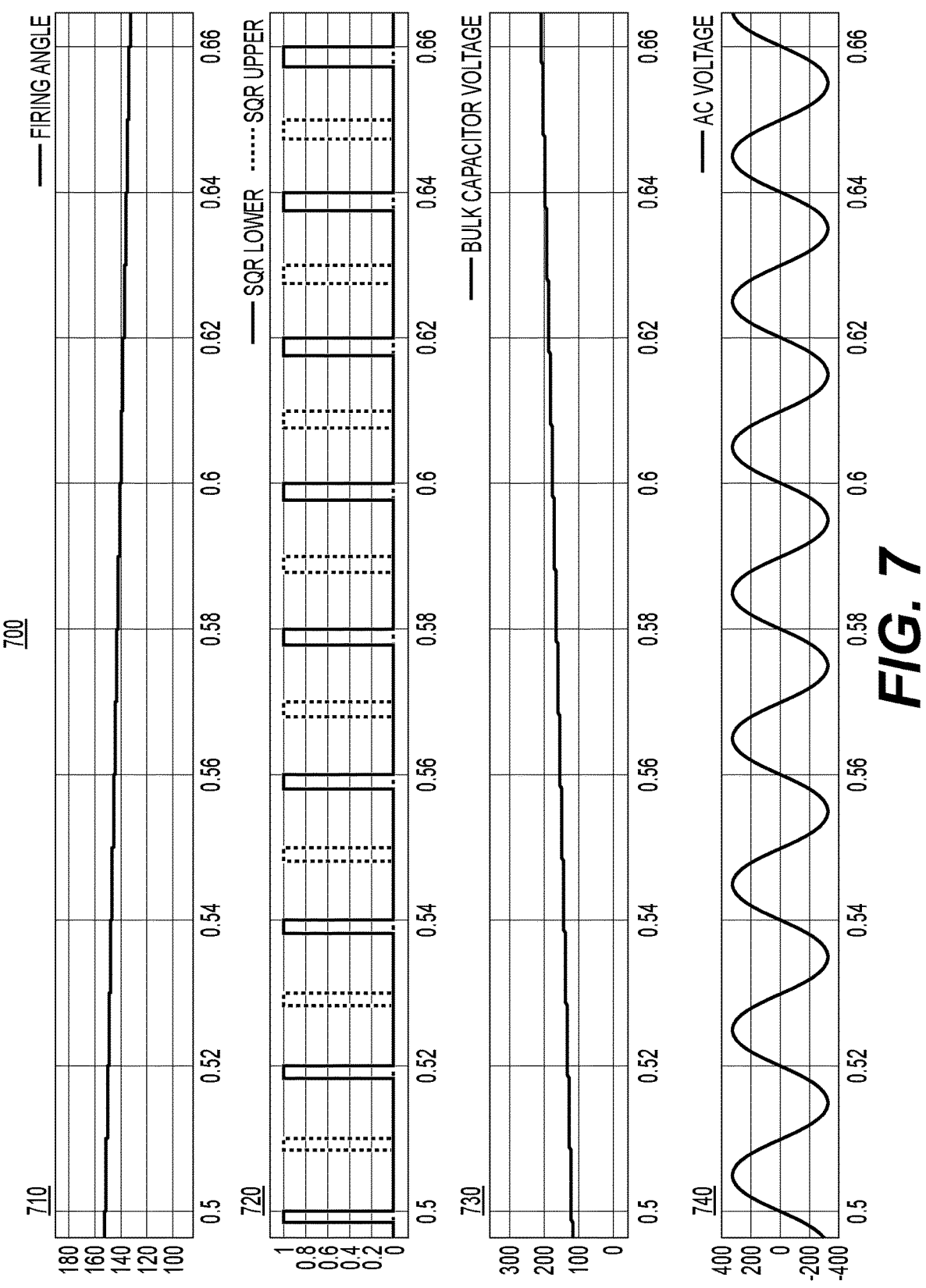
FIG. 7 depicts a plot of signals for a battery charger with a silicon controlled rectifier to pre-charge a bulk capacitor, according to one or more embodiments.

FIG. 7 depicts a plot 700 of signals for a battery charger with a silicon controlled rectifier to pre-charge a bulk capacitor, according to one or more embodiments. As shown in FIG. 7, a bulk capacitor may be pre-charged from a non-zero voltage. As shown in FIG. 7, a firing angle 710 may decrease and a pulse width 720 may increase as a bulk capacitor voltage 730 increases based on an input AC voltage 740. As shown, the firing angle 710 and pulse width 720 may change multiple times in a single AC cycle (e.g. in the period from 0.56 seconds to 0.58 seconds).

One or more embodiments may reduce high AC currents by determining a firing angle to ensure AC currents are within limits. One or more embodiments may avoid increasing AC currents as capacitor voltage increases by reducing the increase in firing angle as capacitor voltage increases. One or more embodiments may use two MOSFETs and two SCRs which are part of the PFC boost converter to maintain a semiconductor component count. One or more embodiments may eliminate AC relay life cycle issues and monitoring of switching life time by eliminating the AC relay and resistor/PTC.

One or more embodiments may use a silicon controlled rectifier (SCR) in a neutral leg of a PFC so that no additional hardware is required to perform AC pre-charge of a bulk capacitor, as the silicon controlled rectifiers are also used for PFC operation. One or more embodiments may provide a dynamic and adjustable pre-charge control algorithm to drive an SCR-based bulk capacitor charge circuit. One or more embodiments may use PFC boost converter components and do not require any additional components.

One or more embodiments may turn on an SCR in a second and fourth quadrant of an AC cycle, and automatically turn off the SCR at the respective following zero crossing of the AC cycle. One or more embodiments may determine a firing angle where the SCR can be turned on to charge the bulk capacitor while ensuring the AC current remains within specified limits. One or more embodiments may calculate the next firing angle based on the current bulk capacitor voltage, which may allow non-zero voltage bulk capacitor pre-charge. An AC voltage measurement may be used to monitor a line voltage drop or dip. One or more embodiments may include a continuous running control algorithm in a microprocessor to ensure a calculation is completed in each AC half cycle before the SCR is turned ON. One or more embodiments may change an AC current limit during the pre-charge operation. For example, one or more embodiments may decrease pre-charge time by increasing current limit at lower AC voltages. One or more embodiments may include a combination of a MOSFET and SCR, which may allow easier control and longer runtime than an AC relay.

One or more embodiments may determine a firing angle value using AC current limit, present bulk capacitor voltage, PFC inductance, bulk capacitor value, AC voltage, and AC frequency. One or more embodiments may convert, using a sine of the determined firing angle, for example, the determined firing angle to an AC voltage value at which the SCR should be turned on. One or more embodiments may use a difference between the AC voltage value at which SCR will be turned on and the bulk capacitor present voltage for a validity check. One or more embodiments may evaluate the bulk capacitor voltage change validity by confirming the new firing angle would result in a rise of the bulk capacitor voltage.

One or more embodiments may perform a calculation as capacitor voltage increases, and may use the required AC current limits to determine the firing angle. The firing angle calculation may run during the AC voltage quarter cycle in each half cycle and an SCR may be turned on during the next quarter cycle. The firing angle may be calculated to ensure the AC current pulses are within limits.

One or more embodiments may perform a continuous calculation of firing angle, which offers flexibility in the AC pre-charge process as compared to passive components pre-charge, where pre-charge time and AC current are dependent on input AC voltage and temperature, and cannot be controlled per requirements. One or more embodiments may determine a firing angle based on the required AC current limit and current capacitor voltage, which ensures control of AC current as needed for the pre-charge time. One or more embodiments may use a continuous control algorithm running on a microprocessor to consider multiple limits and requirements, and determine the SCR turn on time every half AC cycle, which provides robust control.

One or more embodiments may maintain the AC current pulse magnitude as the bulk capacitor is charged. One or more embodiments may calculate the next firing angle to maximize the AC current pulse magnitude when the bulk capacitor is charged to a threshold voltage. One or more embodiments may limit AC current pulses to a requirement while ensuring pre-charge is completed at a fast rate. One or more embodiments may use MOSFETs and SCRs, which provide easier control and longer run time than AC relays.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising:

a battery charger to convert alternating current (AC) power to direct current (DC) power to charge a battery, wherein the battery charger includes:

an upper switch to condition an input voltage and input current;

a lower switch to condition the input voltage and the input current;

an upper silicon controlled rectifier (SCR);

a lower SCR;

a bulk capacitor; and one or more controllers, wherein the one or more controllers are configured to use a dynamic and adjustable pre-charge control algorithm to control the upper SCR and the lower SCR to pre-charge the bulk capacitor, wherein the one or more controllers are configured to determine a firing angle based on a threshold AC current, a voltage of the bulk capacitor, an inductance of a PFC converter, a capacitance of the bulk capacitor, a voltage of an input power, and a frequency of the input power to control the upper SCR and the lower SCR to pre-charge the bulk capacitor, and wherein the one or more controllers are configured to use the control algorithm in a continuous running configuration to determine the firing angle to ensure a calculation is completed in each AC half cycle before the upper SCR or the lower SCR is turned on.

2. The system of claim 1, wherein the one or more controllers are further configured to control the upper switch and the lower switch.

3. The system of claim 1, wherein the one or more controllers are further configured to determine the firing angle so that the firing angle is reduced as a voltage of the bulk capacitor increases.

4. The system of claim 1, wherein the one or more controllers are further configured to increase the threshold AC current at lower AC voltages.

5. The system of claim 1, wherein the upper switch, lower switch, upper SCR and lower SCR are a power factor correction (PFC) converter.

6. The system of claim 1, further comprising:
the battery configured to receive the DC power from the battery charger.

7. A vehicle comprising the system of claim 6.

8. A system to pre-charge a bulk capacitor, the system comprising:
an upper silicon controlled rectifier (SCR) to switch an input power to a bulk capacitor;
a lower SCR to switch the input power to the bulk capacitor; and
one or more controllers, wherein the one or more controllers are configured to use a dynamic and adjustable pre-charge control algorithm to control the upper SCR and the lower SCR to pre-charge the bulk capacitor, wherein the one or more controllers are configured to determine a firing angle based on a threshold AC current, a voltage of the bulk capacitor, an inductance of a PFC converter, a capacitance of the bulk capacitor, a voltage of the input power, and a frequency of the input power to control the upper SCR and the lower SCR to pre-charge the bulk capacitor, and wherein the one or more controllers are configured to use the control algorithm in a continuous running configuration to determine the firing angle to ensure a calculation is completed in each AC half cycle before the upper SCR or the lower SCR is turned on.

9. The system of claim 8, wherein the upper SCR and lower SCR are in a power factor correction (PFC) converter.

10. A method comprising:
receiving, by one or more controllers, one or more input variables including one or more of a threshold AC current, a voltage of a bulk capacitor, an inductance of a PFC converter, a capacitance of the bulk capacitor, a voltage of an input power, or a frequency of the input power; and
controlling, using a dynamic and adjustable pre-charge control algorithm, one or more silicon controlled rectifiers to pre-charge the bulk capacitor based on the one or more input variables, wherein the controlling the one or more silicon controlled rectifiers further comprises:
determining, using the control algorithm in a continuous running configuration, a firing angle based on the threshold AC current, the voltage of the bulk capacitor, the inductance of the PFC converter, the capacitance of the bulk capacitor, the voltage of the input power, and the frequency of the input power to ensure a calculation is performed in each AC half cycle before the one or more silicon controlled rectifiers are turned on, and
controlling the one or more silicon controlled rectifiers to pre-charge the bulk capacitor based on the determined firing angle.

11. The method of claim 10, wherein the controlling the one or more silicon controlled rectifiers further comprises:
changing the threshold AC current during the pre-charge of the bulk capacitor.

* * * * *